United States Patent
De Villele

(10) Patent No.: US 6,446,781 B1
(45) Date of Patent: Sep. 10, 2002

(54) RECEPTACLE-TRANSFER INSTALLATION INCLUDING A DEFLECTOR MEMBER

(75) Inventor: Damien De Villele, La Ferte Bernard (FR)

(73) Assignee: Serac Group, La Ferte Bernard (FR)

( * ) Notice: Subject to any disclaimer, the term of this patent is extended or adjusted under 35 U.S.C. 154(b) by 20 days.

(21) Appl. No.: 09/697,075

(22) Filed: Oct. 27, 2000

(30) Foreign Application Priority Data

Oct. 29, 1999 (FR) .............................................. 99 13570

(51) Int. Cl.[7] .............................................. B65G 47/22
(52) U.S. Cl. ........................ 198/364; 198/367; 198/890
(58) Field of Search ................................. 198/364, 367, 198/367.1, 367.2, 890, 441, 478.1

(56) References Cited

U.S. PATENT DOCUMENTS

| | | | | |
|---|---|---|---|---|
| 2,827,998 A | * | 3/1958 | Breeback | 198/441 |
| 4,125,184 A | * | 11/1978 | Seragnoli | 198/442 |
| 4,295,558 A | * | 10/1981 | Heckmann | 198/367 |
| 4,369,873 A | * | 1/1983 | Heuft | 198/367 |
| 4,467,908 A | * | 8/1984 | Schneider | 198/441 |

FOREIGN PATENT DOCUMENTS

EP 0071068 A1 9/1983

OTHER PUBLICATIONS

Keiichi, M., English abstract of Japanese patent 56 099123, Oct. 8, 1981.

* cited by examiner

Primary Examiner—Donald P. Walsh
Assistant Examiner—Kenneth W Bower
(74) Attorney, Agent, or Firm—Birch, Stewart, Kolasch & Birch, LLP

(57) ABSTRACT

The receptacle transfer installation comprises an upstream transport starwheel adapted to support the receptacles via their collars, a first downstream transport starwheel, a second downstream transport starwheel. An upstream guide extends as far as the first downstream transport starwheel, and a fixed downstream guide having a first branch extending around a portion of the first downstream transport starwheel and a second branch extending around a portion of the upstream transport starwheel between the two downstream transport starwheels. A deflector member is mounted to move between a first position in which the deflector member extends the first branch of the downstream guide and a second position in which the deflector member connects the upstream guide to the second branch of the downstream guide.

4 Claims, 4 Drawing Sheets

FIG_1

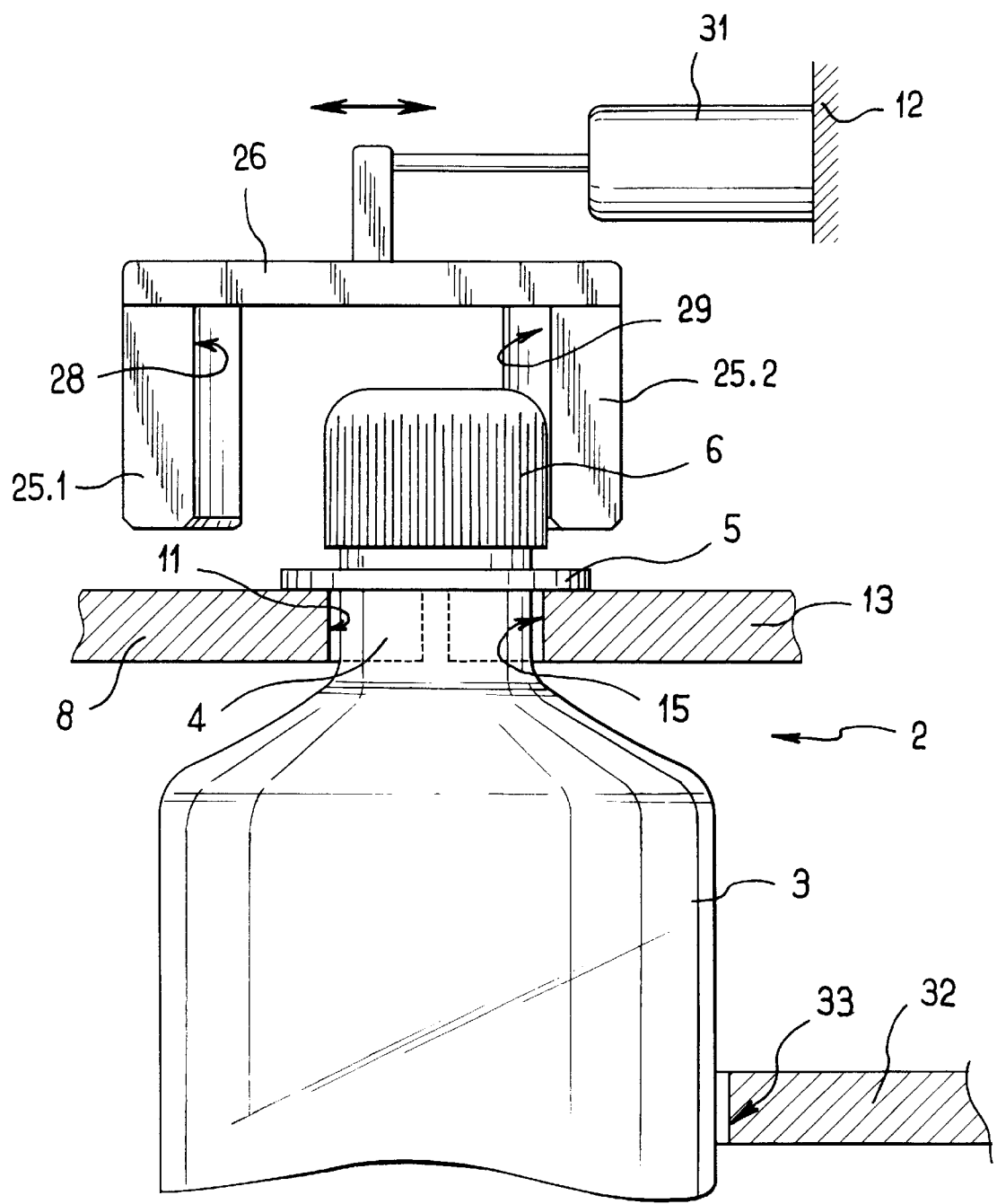
FIG_3

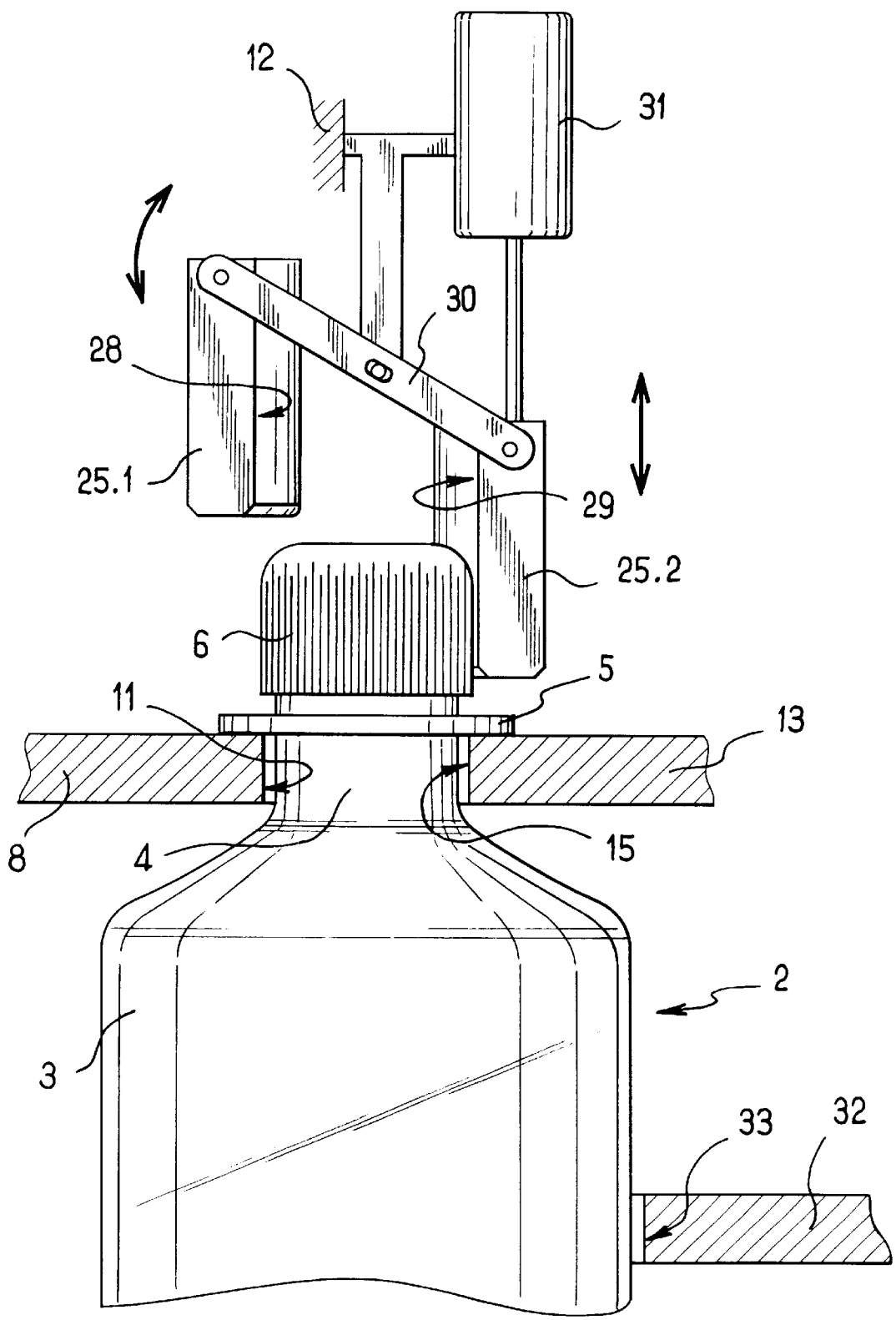
FIG_4

RECEPTACLE-TRANSFER INSTALLATION INCLUDING A DEFLECTOR MEMBER

The present invention relates to an installation for transferring receptacles each having a neck provided with a collar. By way of example, an installation of this type can be used in a bottling plant.

BACKGROUND OF THE INVENTION

In a bottling plant, it is common practice to provide transfer installations that take receptacles reaching the installation and share them between two outlet paths. For example, such an installation can be placed at the outlet from a carousel for stoppering receptacles in order to direct properly stoppered receptacles to a zone for packaging them in batches, and poorly stoppered receptacles towards a storage zone.

Transfer installations are known that comprise a main conveyor belt, a branch conveyor belt, and a deflector member movable between a projecting position in which the deflector member causes receptacles placed on the main conveyor belt to be deflected onto the branch conveyor belt, and a retracted position in which the receptacles remain on the main conveyor belt. Such an installation is effective only if the receptacle to be deflected is stable since otherwise it risks falling over while being deflected. In order to avoid toppling the receptacle while it is being deflected, the deflector member engages the body of the receptacle level with its center of gravity. It is therefore necessary to adjust the deflector member as a function of the height of the receptacle. Because deflection is applied to the body of the receptacle, the amplitude of the displacement of the deflector member is relatively large, and that limits the operating throughput of such an installation. Furthermore, in order to avoid sudden deflection which might topple receptacles, the speed of the main conveyor belt is relatively low.

Transfer installations also exist that act on the neck, which installations comprise an upstream transport starwheel, a first downstream transport device constituted by a transport starwheel, and a second downstream transport device. The upstream transport starwheel and the transport starwheel of the first downstream transport device have outlines fitted with clamps for taking hold of receptacles by the neck. The clamps are connected to individual control means. Thus, a receptacle is transferred from the upstream transport starwheel to the first downstream transport device by opening the clamp holding the receptacle to the upstream transport starwheel and by simultaneously closing the corresponding clamp on the transport starwheel of the first downstream transport device onto said receptacle. When a receptacle is to be transferred from the upstream transport starwheel to the second downstream transport device, the corresponding clamp on the upstream transport starwheel is held closed while passing through the first downstream transport device and the corresponding clamp on the transport starwheel of the first downstream transport device is left open. Such an installation is complex, in particular concerning the way the clamps are controlled individually. In addition, the clamps are subjected to friction and to forces that give rise to them suffering a relatively large amount of wear.

OBJECTS AND SUMMARY OF THE INVENTION

An object of the invention is to provide a receptacle transfer installation which is simple and of low cost while nevertheless making high rates of throughput possible.

To achieve this object, the invention provides an installation for transferring receptacles each having a body surmounted by a neck provided with a collar, the installation comprising an upstream transport starwheel adapted to support the receptacles by their necks, a first downstream transport device constituted by a transport starwheel, at least one second downstream transport device, a fixed upstream guide extending around a portion of the upstream transport starwheel as far as the first downstream transport device, and a fixed downstream guide having a first branch extending from the upstream transport starwheel around a portion of the transport starwheel of the first downstream transport device and a second branch extending around a portion of the upstream transport starwheel between the first and second downstream transport devices. The installation comprises a deflector member mounted over the upstream transport starwheel and the transport starwheel of the first downstream transport device to move between a first position in which the deflector member extends the first branch of the downstream guide over the upstream transport starwheel, and a second position in which the deflector member connects the upstream guide to the second branch of the downstream guide.

Transfer from the upstream transport starwheel to the transport starwheel of the first downstream transport device is thus implemented by deflecting the neck of the receptacle. Since the cross-sectional size of the neck of the receptacle is generally relatively small, the amplitude of the displacements of the deflector member is not large and as a result the displacements of the deflector member can be very fast. In addition, for bottles at a given spacing, the distance between two necks is relatively large thus giving sufficient time to enable the deflector member to be inserted between two necks even when the travel rate of the receptacles is high. Furthermore, the deflector member is situated above the transport starwheels where there is generally a relatively large amount of space available, thereby simplifying construction of the transfer installation.

In a particular embodiment, the deflector member comprises two facing rows of segments, and the installation has means for displacing the segments in each row independently of one another. When rates of throughput are very high or when the necks are closely spaced together, displacing the segments independently of one another makes it possible to deflect one receptacle without interfering with the following receptacle.

BRIEF DESCRIPTION OF THE DRAWINGS

Other characteristics and advantages of the invention will appear on reading the following description of a particular non-limiting embodiment of the invention.

Reference is made to the accompanying drawings, in which:

FIG. 3 is a fragmentary view of a first embodiment of the deflector member, in fragmentary section on line III—III of FIG. 1; and FIG. 4 is a view analogous to FIG. 3 showing a second embodiment of the deflector member.

MORE DETAILED DESCRIPTION

Figure 1:
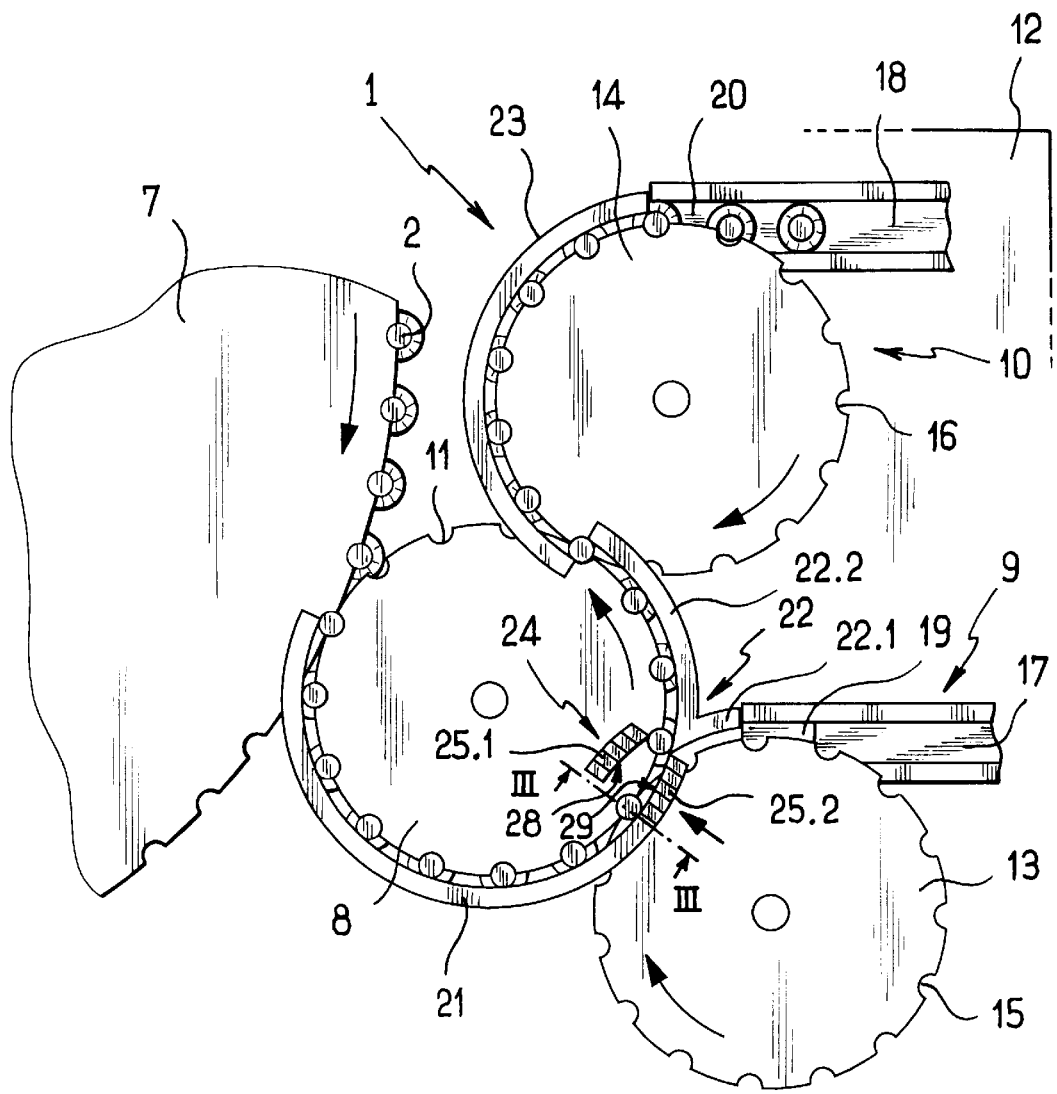
FIGS. 1 and 2 are diagrammatic views showing the operation of the transfer installation of the invention in two different positions of the deflector member.

The transfer installation of the invention whose preferred embodiment is illustrated is intended for transporting receptacles given general reference 2, each receptacle comprising a body 3 surmounted by a neck 4 which is surrounded by a collar 5 and a mouth that is closed by a cork 6. The transfer installation given overall reference 1 is disposed in this case in a bottling plant for unloading a stoppering carousel 7.

Figure 2:
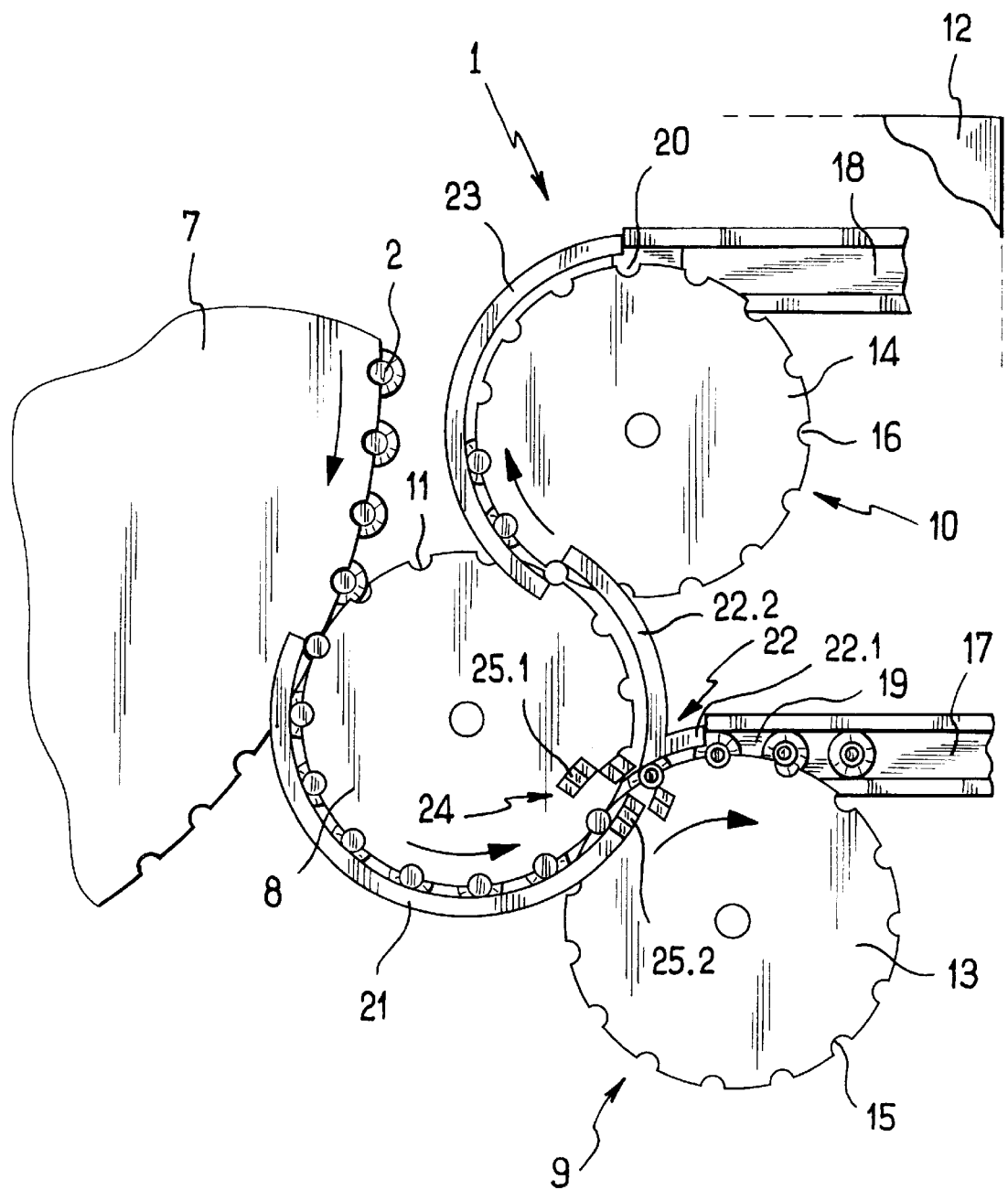

With reference to FIGS. 1 and 2, the transfer installation 1 comprises an upstream transport starwheel 8 and two downstream transport devices 9 and 10.

The upstream transport starwheel 8 has its outline provided with slots 11 for receiving the necks 4 of the receptacles 2 and for supporting them by means of their collars 5. The upstream transport starwheel is mounted on a frame 12 so as to turn in register with the carousel 7.

Each downstream transport device 9, 10 has a respective transport starwheel 13, 14 whose outline is provided with slots 15, 16 for receiving the necks 4 of the receptacles 2 and for supporting them via their collars 5. Each of the transport starwheels 13 and 14 is preferably associated with a lower turntable 32 located beneath the corresponding transport starwheel and possessing an outline provided with slots 33 for receiving the bodies 3 of the receptacles 2 being transported. The transport starwheels 13 and 14 are mounted on the frame 12 so as to turn in register with the upstream transport starwheel 8.

Each downstream transport device 9, 10 also has an evacuation conveyor 17, 18 extending away therefrom tangentially relative to the transport starwheel 13, 14. A respective sloping plate 19, 20 forming a ramp sloping up towards the corresponding conveyor is placed immediately ahead of the conveyor 17, 18.

An upstream guide 21 fixed to the frame 12 surrounds a portion of the upstream transport starwheel 8 and possesses an end that extends over the carousel 7 so as to interfere with the path followed by the mouths of the receptacles, and has an opposite end extending in corresponding manner over the transport starwheel 13.

A substantially V-shaped downstream guide 22 is fixed to the frame 12. The downstream guide 22 has a first branch 22.1 extending away from the upstream transport starwheel 8 around a portion of the transport starwheel 13 as far as the conveyor 17, and a second branch 22.2 extending around a portion of the upstream transport starwheel 8 away from the transport starwheel 13 as far as the transport starwheel 14.

In a manner analogous to the upstream guide 21, a second downstream guide 23 extends around the transport starwheel 14 and has one end extending over the upstream transport starwheel 8 and an opposite end adjacent to the conveyor 18.

A deflector member given overall reference 24 is disposed above the upstream transport starwheel 8 and the transport starwheel 13.

In a first embodiment as shown in FIG. 3, the deflector member 24 comprises two facing rows each of five segments. Each of the segments in one row is referenced 25.1 and each in the other row is referenced 25.2 (only two of the segments are shown in FIG. 3).

Each segment 25.1 is connected to the facing segment 25.2 by a support element 26 associated with an actuator 31 carried by the frame 12 to slide parallel to the plane of the transport starwheels 8 and 13. The facing surfaces of the segments 25.1 and 25.2 define respective guide surfaces 28 and 29. When a facing pair of segments 25.1 & 25.2 are in a first position, the guide surfaces 28 extend the first branch 22.1 of the downstream guide 22 over the upstream transport starwheel 8. When a facing pair of segments 25.1 & 25.2 are in their second position (as shown in FIG. 3), then the guide surfaces 29 connect the upstream guide 21 to the second branch 22.1 of the downstream guide 22. The displacement stroke of the segments 25.1, 25.2 is selected to be slightly greater than the diameter of a mouth 6.

In operation, with the pairs of segments 25.1 & 25.2 being in their second position and with the carousel 7 and the transport starwheels 8, 13, and 14 rotating in the directions shown in FIG. 2, the receptacles 2 are unloaded from the stoppering carousel 7 and they are held on the upstream transport starwheel 8 by the upstream guide 21. The slots 11 then receive the necks 4 of the receptacles 2 so that they are supported by their collars 5.

The receptacles 2 are then held on the upstream transport starwheel 8 by the guide surfaces 29 as defined by the segments 25.2 over the transport starwheel 13, and then by the second branch 22.2 of the downstream guide 32. The receptacles 2 are then discharged from the upstream transport starwheel 8 by the second downstream guide 23 and are held on the transport starwheel 14 thereby until they reach the conveyor 18.

During rotation of the transport starwheel 14, the bottom of the receptacle 2 bears against the sloping plate 20 located upstream from the conveyor 18. In so doing, the plate 20 causes the receptacle 2 to rise and lifts its collar 5 off the transport starwheel 14 before the receptacle 2 reaches the conveyor 18. This has the effect of stabilizing the receptacle as it arrives on the conveyor 18 and makes it possible to operate at a high rate of throughput. It will be observed that the lower guide turntable 32 in register with the bodies of the receptacles also serves to obtain better stability during transfer.

To deflect the receptacles supported by the upstream transport starwheel 8 to the transport starwheel 13, the actuators 27 are actuated so as to move each pair of segments 25.1 & 25.2 in succession as soon as the last receptacle 2 that is to be conveyed towards the transport starwheel 14 is no longer in contact with the corresponding segment 25.2. The receptacles 2 held on the upstream transport starwheel 8 by the upstream guide 21 then come into contact with the guide surfaces 28 defined by the segments 25.1 while in their first positions and are held on the transport starwheel 13 until they are deposited, in the same manner as described for the downstream transport device 10, onto the conveyor 17 (see FIG. 2). In FIG. 2, pairs of segments 25.1 & 25.2 are shown in a position corresponding to the last moments of discharging a non-stoppered receptacle towards the conveyor 17 while the following receptacle is already being guided towards the conveyor 18.

Elements which are identical or analogous to those described above are given identical reference numerals in the description below of the second embodiment of the deflector member 24 which is described with reference to FIG. 4.

In this embodiment, the segments 25.1 and 25.2 are mounted on the frame 12 so as to move vertically. Facing segments 25.1 & 25.2 are interconnected in pairs via hinges by a rocker 30 mounted to pivot on the frame 12 and connected to an actuator 31.

The travel stroke of the segments 25.1, 25.2 is selected to be slightly less than the height of the mouth.

Thus, when the segments 25.1 are in the high position, the segments 25.2 are in the low position, and vice versa. The mouths of the receptacles 2, whether stoppered or not, are then guided by the segments which are in the low position and they pass beneath the segments which are in the high position.

The second embodiment of the deflector member operates in a manner that is analogous to that of the first embodiment.

Naturally, the invention is not limited to the embodiment described and variants can be made thereto without going beyond the ambit of the invention as defined by the claims.

In particular, facing segments 25.1 & 25.2 can be independent of each other, but under such circumstances it is necessary to provide synchronized control members for the facing segments.

In addition, the segments can be mounted on the frame 12 so as to pivot eccentrically about a vertical axis.

Also, even though the deflector member 24 is described as being made up of two rows of facing segments, the deflector member 24 could be made up of two facing paddles. This embodiment is particularly advantageous when the distance between receptacles on the transport starwheels is relatively great, but that leads to lower rates of throughput than when using receptacles that are very close together.

Although the installation of the invention is described with a second downstream transport device in the form of an intermediate transport starwheel, it is possible to use a linear conveyor which is directly connected to the upstream transport starwheel. It is also possible to have more than two downstream transport devices.

What is claimed is:

1. An installation for transferring receptacles each having a body surmounted by a neck provided with a collar, the installation comprising an upstream transport starwheel adapted to support the receptacles by their necks, a first downstream transport device constituted by a transport starwheel, at least one second downstream transport device, a fixed upstream guide extending around a portion of the upstream transport starwheel as far as the first downstream transport device, a fixed downstream guide having a first branch extending from the upstream transport starwheel around a portion of the transport starwheel of the first downstream transport device and a second branch extending around a portion of the upstream transport starwheel between the first and second downstream transport devices, a deflector member comprising two facing rows of segments, said deflector being mounted over the upstream transport starwheel and the transport starwheel of the first downstream transport device to move between a first position in which the deflector member extends the first branch of the downstream guide over the upstream transport starwheel and a second position in which the deflector member connects the upstream guide to the second branch of the downstream guide, and means for displacing the segments of each row independently of one another.

2. The transfer installation according to claim 1, wherein the segments are mounted to slide in a vertical direction.

3. The transfer installation according to claim 1, wherein facing segments are connected to each other by a rocker.

4. The transfer installation according to claim 1, wherein the downstream transport starwheel has a lower turntable with slots disposed to extend in register with the bodies of the receptacles.

* * * * *